United States Patent
Yu (10) Patent No.: US 9,591,528 B2
(45) Date of Patent: Mar. 7, 2017

(54) DATA FORWARDING METHOD, DEVICE, AND BASE STATION

(71) Applicant: Huawei Technologies Co., Ltd., Shenzhen, Guangdong (CN)

(72) Inventor: Weidong Yu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 241 days.

(21) Appl. No.: 14/577,863

(22) Filed: Dec. 19, 2014

(65) Prior Publication Data

US 2015/0103655 A1 Apr. 16, 2015

Related U.S. Application Data

(63) Continuation of application No. PCT/CN2013/077677, filed on Jun. 21, 2013.

(30) Foreign Application Priority Data

Jun. 21, 2012 (CN) .......................... 2012 1 0208454

(51) Int. Cl.
*H04W 28/22* (2009.01)
*H04W 28/06* (2009.01)
*H04W 88/08* (2009.01)

(52) U.S. Cl.
CPC .......... *H04W 28/22* (2013.01); *H04W 28/065* (2013.01); *H04W 88/085* (2013.01)

(58) Field of Classification Search
CPC ...................................................... G06F 17/142
See application file for complete search history.

(56) References Cited

U.S. PATENT DOCUMENTS

| 8,165,164 | B1 | 4/2012 | Hammer et al. |
| 8,644,133 | B2 * | 2/2014 | Diab ................ H04L 12/40136 370/220 |
| 2008/0225816 | A1 | 9/2008 | Osterling et al. |

FOREIGN PATENT DOCUMENTS

| CN | 1860811 A | 11/2006 |
| CN | 101997582 A | 3/2011 |
| CN | 102740377 A | 10/2012 |
| EP | 2 373 116 A1 | 10/2011 |
| WO | 2005/048624 A1 | 5/2005 |

OTHER PUBLICATIONS

"Common Public Radio Interface (CPRI); Interface Specification", CPRI Specification V4.2, Sep. 29, 2010, 113 pages.
"Common Public Radio Interface (CPRI); Interface Specification", CPRI Specification V3.0, Oct. 20, 2006, 89 pages.

* cited by examiner

*Primary Examiner* — Chandrahas Patel (57) ABSTRACT

The present invention provides a data forwarding method, device, and base station and belongs to the field of communications. According to the present invention, when forwarding data, radio equipment can forward data according to a rate different from a rate at which the data is received.

16 Claims, 5 Drawing Sheets

DATA FORWARDING METHOD, DEVICE, AND BASE STATION

CROSS-REFERENCE TO RELATED APPLICATIONS

This application is a continuation of International Application No. PCT/CN2013/077677, filed on Jun. 21, 2013, which claims priority to Chinese Patent Application No. 201210208454.9, filed on Jun. 21, 2012, both of which are hereby incorporated by reference in their entireties.

TECHNICAL FIELD

The present invention relates to the field of communications, and in particular, to a data forwarding method, device, and base station.

BACKGROUND

A standard interface of a CPRI (Common Public Radio Interface, Common Public Radio Interface) is a standard of an interface between a baseband unit and a radio frequency unit that are inside a radio base station, which is initiated and defined by the Common Public Radio Interface. Currently, the CPRI interface is widely used in a base station device of a third generation mobile communications system. An entity corresponding to an REC (Radio Equipment Controller) inside the radio base station is a baseband unit, and an entity corresponding to an RE (Radio Equipment, radio equipment) inside the radio base station is a radio frequency unit.

In a physical layer defined in the CPRI protocol, a super frame is a most basic processing object, and each super frame includes 256 basic frames. When transmission of CPRI data is performed, a frame forming operation is performed on the CPRI data according to a certain format to form a basic frame and a basic frame is used as a unit and transmitted between an REC and an RE or between two REs.

In a CPRI link, an REC is a chain head of the CPRI link, and multiple REs may be connected in sequence after the REC. After organizing to-be-delivered data as a basic frame, the REC transmits the basic frame downstream over the CPRI link in sequence. When basic frames received by an RE form one super frame, the RE forwards the basic frames included in the super frame.

However, in an existing manner, when forwarding data, the RE can forward the data only according to a same rate at which the data is received, so that the RE cannot forward the data according to a rate different from a rate at which the data is received.

SUMMARY

Embodiments of the present invention provide a data forwarding method, device, and base station. According to the present invention, when forwarding data, an RE can forward data according to a rate different from a rate at which the data is received.

To achieve the foregoing objective, the embodiments of the present invention use the following technical solutions:

A data forwarding method includes:

receiving, by a current device, a basic frame that is sent by a first device according to a first transmission rate, where the basic frame includes a control word and at least one data block;

when basic frames received by the current device form a super frame, extracting a control word in each basic frame in sequence, and storing the extracted control word in a buffer area;

converting, by the current device, each control word in the buffer area in sequence according to a second transmission rate supported by a second device, so as to obtain a corresponding target control word;

migrating, by the current device, each data block in each basic frame in sequence according to pre-stored data migration information, so as to obtain a target basic frame corresponding to each basic frame, where the data migration information includes migration information of each basic frame, and the migration information of each basic frame includes: the number of data blocks, an identifier of each data block, a length of an area on which each data block resides, a start address of each data block before the migrating, and a start address of each data block after the migrating, which are included in the basic frame; and inserting, by the current device, each target control word into each target basic frame in sequence, and sending each target basic frame to the second device according to the second transmission rate.

A data forwarding device includes:

a receiving unit, configured to receive a basic frame that is sent by a first device according to a first transmission rate, where the basic frame includes a control word and at least one data block;

an extraction unit, configured to: when received basic frames form a super frame, extract a control word in each basic frame in sequence and store the extracted control word in a buffer area;

a converting unit, configured to convert each control word in the buffer area in sequence according to a second transmission rate supported by a second device, so as to obtain a corresponding target control word;

a migrating unit, configured to migrate each data block in each basic frame in sequence according to pre-stored data migration information, so as to obtain a target basic frame corresponding to each basic frame, where the data migration information includes migration information of each basic frame, and the migration information of each basic frame includes: the number of data blocks, an identifier of each data block, a length of an area on which each data block resides, a start address of each data block before the migrating, and a start address of each data block after the migrating, which are included in the basic frame; and a sending unit, configured to insert each target control word into each target basic frame in sequence, and send each target basic frame to the second device according to the second transmission rate.

The embodiments of the present invention provide a data forwarding method, device, and base station, and according to the present invention, an RE can complete conversion of each basic frame from a first transmission rate to a second transmission rate, so that the RE can forward data according to a rate different from a rate at which the data is received.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 2:
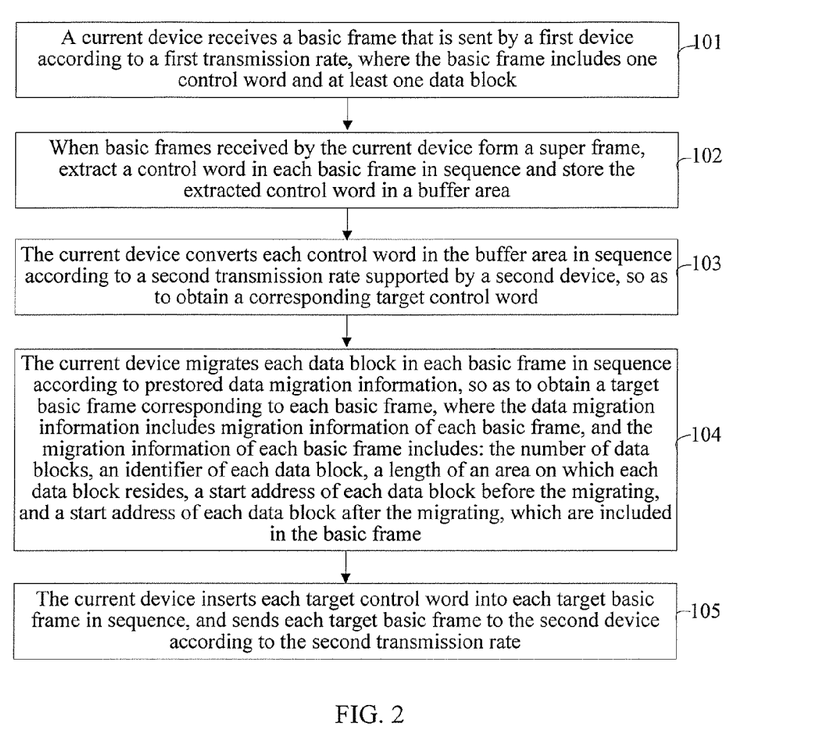
FIG. 2 is a flowchart of a data forwarding method according to Embodiment 1.

Referring to FIG. 2, a data forwarding method provided in this embodiment specifically includes the following steps:

101: A current device receives a basic frame that is sent by a first device according to a first transmission rate, where the basic frame includes a control word and at least one data block.

Figure 1:
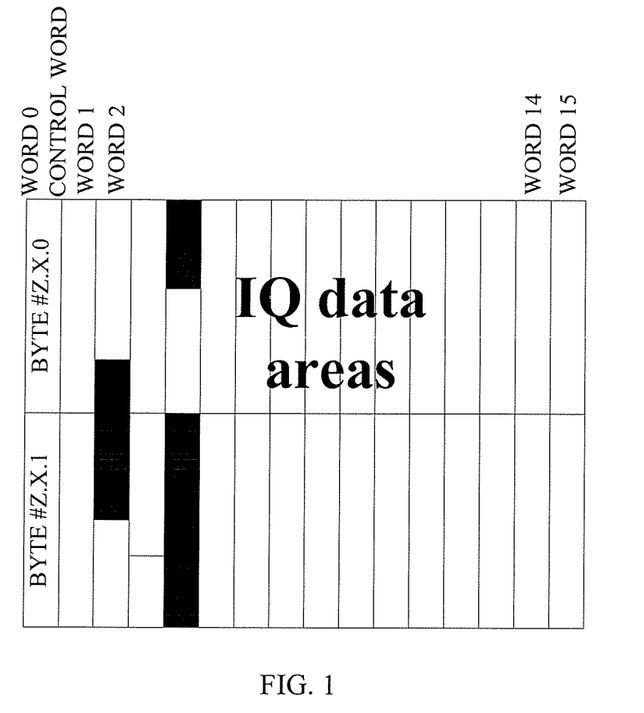
FIG. 1 is a schematic structural diagram of a basic frame.

Specifically, refer to FIG. 1, which is a schematic structural diagram of a basic frame, and each basic frame is formed by 16 field areas (words). The first field area (that is, word 0) is a control word area and may be used for placing a control word. The rest 15 field areas (that is, from word 1 to word 15) are IQ (In-phase Quadrature) data areas and may be used for placing IQ data. According to a difference of a transmission rate of an REC or an RE, the number of bits (Byte) included in each field area is different. FIG. 1 shows a schematic diagram of a basic frame in which each field area contains 2 Bytes of data.

102: When basic frames received by the current device form a super frame, extract a control word in each basic frame in sequence and store the extracted control word in a buffer area.

The super frame received by the current device includes 256 basic frames, and each basic frame includes a control word, where 256 control words of the super frame form 64 subchannels according to a certain format and each subchannel includes 4 control words. When processing the super frame, an RE needs to extract the control word in each basic frame in the super frame, where each subchannel corresponds to 4 basic frames. The 256 control words in the super frame have different functions separately. Refer to Table 1.

TABLE 1

| Subchannel number Ns | Purpose of subchannel | Xs = 0 | Xs = 1 | Xs = 2 | Xs = 3 |
|---|---|---|---|---|---|
| 0 | sync&timing | sync byte K28.5 | HFN | BFN-low | BFN-high |
| 1 | slow C&M | slow C&M | slow C&M | slow C&M | slow C&M |
| 2 | L1 inband prot. | version | startup | L1-reset-LOS . . . | pointer p |
| 3 | reserved | reserved | reserved | reserved | reserved |
| . . . | . . . | . . . | . . . | . . . | . . . |
| 15 | reserved | reserved | reserved | reserved | reserved |
| 16 | vendor specific | vendor specific | vendor specific | vendor specific | vendor specific |
| . . . | . . . | . . . | . . . | . . . | . . . |
| p-1 | vendor specific | vendor specific | vendor specific | vendor specific | vendor specific |
| pointer: p | fast C&M | fast C&M | fast C&M | fast C&M | fast C&M |
| . . . | . . . | . . . | . . . | . . . | . . . |
| 63 | fast C&M | fast C&M | fast C&M | fast C&M | fast C&M |

103: The current device converts each control word in the buffer area in sequence according to a second transmission rate supported by a second device, so as to obtain a corresponding target control word.

104: The current device migrates each data block in each basic frame in sequence according to prestored data migration information, so as to obtain a target basic frame corresponding to each basic frame, where the data migration information includes migration information of each basic frame, and the migration information of each basic frame includes: the number of data blocks, an identifier of each data block, a length of an area on which each data block resides, a start address of each data block before the migrating, and a start address of each data block after the migrating, which are included in the basic frame.

105: The current device inserts each target control word into each target basic frame in sequence, and sends each target basic frame to the second device according to the second transmission rate.

The present invention provides a data forwarding method, and according to the method, an RE can complete conversion of each basic frame from a first transmission rate to a second transmission rate, so that the RE can forward data according to a rate different from a rate at which the data is received.

Embodiment 2

Figure 3:
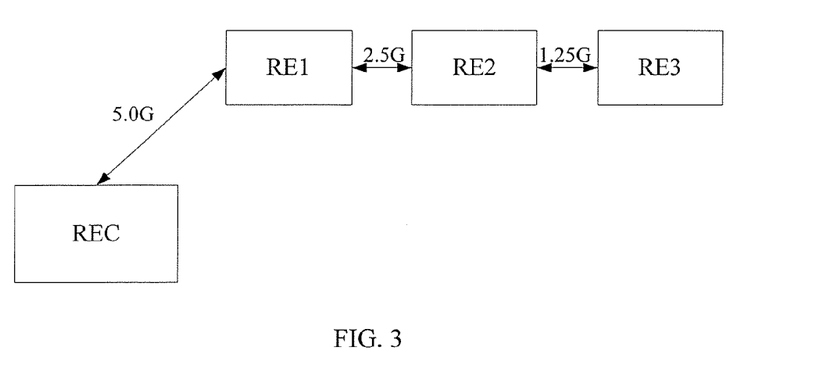
FIG. 3 is a schematic structural diagram of a base station.

As shown in FIG. 3, firstly, a brief introduction is made to a base station applicable to the embodiment of the present invention. The base station includes an REC and REs whose transmission rates are 5G, 2.5G, and 1.25G separately. To facilitate forwarding of CPRI data, in a CPRI link, an RE with a high transmission rate is installed near the REC and an RE with a low transmission rate is installed at a remote end of the CPRI link.

Figure 4:
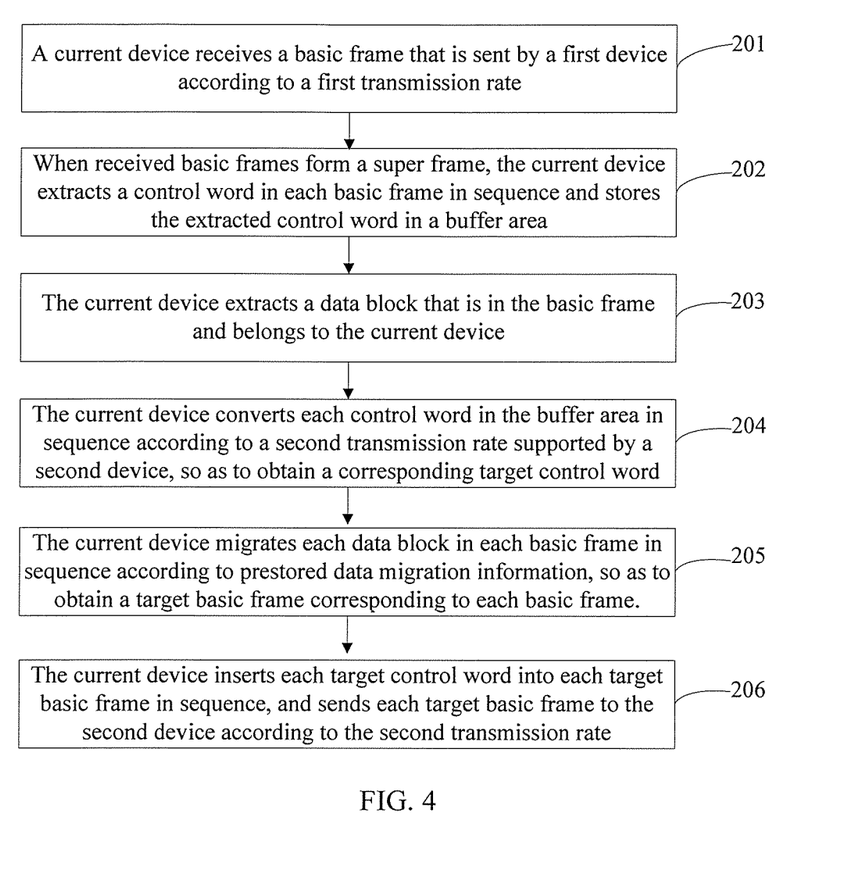
FIG. 4 is a flowchart of a data forwarding method according to Embodiment 2.

As shown in FIG. 4, in an implementation manner of the embodiment of the present invention, a forwarding process of downlink CPRI data is used as an example to introduce a data forwarding method. In the implementation manner, a first transmission rate is greater than a second transmission rate, a current device is an RE, a first device is an RE or the REC, and a second device is an RE.

As shown in FIG. 3, that the current device is an RE1, the first device is the REC, and the second device is an RE2 is used as an example to specifically describe this embodiment.

201: The current device receives a basic frame that is sent by the first device according to the first transmission rate.

As shown in FIG. 1, each basic frame includes a control word area and IQ data areas, where the control word area is used to carry a control word and corresponds to an area indicated by Word 0 in FIG. 1; and the IQ data areas are used to carry IQ data and correspond to areas indicated by Words 1-15 in FIG. 1.

When a basic frame is transmitted according to a different transmission rate, the number of data bits that can be stored in each field area (that is, a storage area represented by each Word within Word 0-Word 15 in FIG. 1) in the basic frame is also different.

For example, under a 5G transmission rate, data that can be stored in each field area in the basic frame is 20 Bytes, where data that can be stored in the field area Word 0 used for carrying a control word is 20 Bytes and total data that can be stored in the field areas Words 1-15 used for carrying IQ data is 20*15=300 Bytes.

For another example, under a 2.5G transmission rate, data that can be stored in each field area in the basic frame is 10 Bytes, where data that can be stored in the field area Word 0 used for carrying a control word is 10 Bytes and total data that can be stored in the field areas Words 1-15 used for carrying IQ data is 10*15=150 Bytes.

To clearly describe the embodiment of the present invention, the following uses the first transmission rate being 5G and the second transmission rate being 2.5G as an example for description.

For example, this step specifically is: the RE1 receives a basic frame that is sent by the REC according to the 5G transmission rate.

It should be noted that, when the RE1 receives the basic frame sent by the REC, the basic frame is received by using an S port of the RE1, where the S port is an interface that supports the 5G transmission rate.

202: When received basic frames form a super frame, the current device extracts a control word in each basic frame in sequence and stores the extracted control word in a buffer area.

Further, an RE performs an operation on data by using a super frame as a basic unit. Control words included in a super frame may be classified into two types: One type is valid control words and the other type is invalid control words.

The valid control words include a specific control words and a non-specific control word, where the specific control word is an HDLC control word corresponding to a slow control and maintenance channel and an ETH control word corresponding to a fast control and maintenance channel; and a the non-specific control word is a valid control word except for the specific control words. An invalid control word is a reserved byte.

203: The current device extracts a data block that is in the basic frame and belongs to the current device.

In this embodiment, a method for extracting a data block that is in each basic frame and belongs to the current device in sequence belongs to the prior art and is not repeatedly described herein.

It should be noted that after the current device extracts a data block that is in the basic frame and belongs to the current device, optionally, the method may further include: The current device deletes the data block that is in the basic frame and belongs to the current device.

It should be further noted that after the current device extracts a data block that is in the basic frame and belongs to the current device, the data block that is in the basic frame and belongs to the current device may also not be deleted but the data block that is in the basic frame and belongs to the current device, together with another data block, is sent to the second device.

In this embodiment, the foregoing step 203 may be performed before step 202, or the foregoing step 202 and step 203 may be performed at the same time.

204: The current device converts each control word in the buffer area in sequence according to a second transmission rate supported by the second device, so as to obtain a corresponding target control word.

For example, the RE1 converts each control word in the buffer area in sequence according to a 2.5G transmission rate supported by the RE2, so as to obtain the corresponding target control word.

In an implementation manner of the embodiment of the present invention, when the control word in the buffer area is a specific control word, the current device converts all bits of the specific control word to target bits corresponding to the second transmission rate supported by the second device, so as to form the target control word.

The specific control word is the HDLC control word corresponding to the slow control and maintenance channel and the ETH control word corresponding to the fast control and maintenance channel.

For example, under the 5G transmission rate, each control word may be represented by using 20 Bytes. If the transmission rate supported by the RE2 is 2.5G, only 10 Bytes of data can be included in each Word in a basic frame of the RE2. Therefore, when the control word in the buffer area is a specific control word, the RE1 needs to convert each control word with 20 Bytes to two control words with 10 Bytes.

In an implementation manner of the embodiment of the present invention, when the control word in the buffer area is a non-specific control word, the current device retains a part of bits, corresponding to the second transmission rate supported by the second device, in the non-specific control word, and deletes the other bits, so as to form the target control word.

The non-specific control word is a valid control word except for the specific control words.

For example, under the 5G transmission rate, each control word may be represented by using 20 Bytes. If the transmission rate supported by the RE2 is 2.5G, only 10 Bytes of data can be included in each word in a basic frame of the RE2. Therefore, when the control word in the buffer area is a non-specific control word, the RE1 retains only the first 10 Bytes in each non-specific control word and deletes the last 10 Bytes.

It should be noted that, in this embodiment, because two target control words corresponding to each specific control word in the buffer area are obtained after conversion of each specific control word, the number of target control words is more than the number of control words before the conversion. In this case, a reserved byte in the super frame may be used to store a redundant target control word, thereby avoiding a phenomenon of no place for storage when the number of target control words is relatively large.

205: The current device migrates each data block in each basic frame in sequence according to prestored data migration information, so as to obtain a target basic frame corresponding to each basic frame.

The data migration information includes migration information of each basic frame, and the migration information of each basic frame includes: the number of data blocks, an identifier of each data block, a length of an area on which each data block resides, a start address of each data block before the migrating, and a start address of each data block after the migrating, which are included in the basic frame.

It should be noted that the data migration information may be obtained by the REC by performing pre-calculation according to different transmission rates respectively supported by the first device, the second device, and the current device, and is respectively saved in the first device, the second device, and the current device before CPRI link data forwarding is performed. The data migration information ensures that, in the forwarding process of the downlink CPRI data, when the transmission rate is the largest, the number of total bits occupied by data blocks in the IQ data areas in each basic frame does not exceed the maximum number of bits that can be carried in the IQ data areas in the basic frame after the migrating according to a different transmission rate. In the data migration information, how to migrate the data blocks in the basic frame according to a different transmission rate is specified.

Specifically, the data migration information includes the migration information of each basic frame, and the migration information of each basic frame may be stored in the following form in the current device, as shown in Table 2.

TABLE 2

| FIELD | Length (Byte) |
|---|---|
| Downlink original data block: | |
| Number of Shifting-field | 2 |
| >Field ID | 2 |
| >Start Bit | 2 |
| >Bit Length | 2 |
| Downlink destination data block: | |
| >Start Bit | 2 |

In this embodiment, a downlink original data block refers to a data block that is in a basic frame and sent by the REC to the RE1, and a downlink destination data block refers to a data block after the RE1 performs data migration.

Attributes of a downlink original data block are as follows:

Number of Shifting-field: indicating the number of data blocks included in the basic frame;

Field ID: indicating an identifier of each data block;

Start Bit: indicating a start address of each data block before migrating; and

Bit Length: indicating a length of an area on which each data block resides.

Attributes of a downlink destination data block are as follows:

Start Bit: indicating a start address of each data block after migrating.

206: The current device inserts each target control word into each target basic frame in sequence, and sends each target basic frame to the second device according to the second transmission rate.

For example, the RE1 inserts each target control word into each target basic frame in sequence, and sends each target basic frame to the RE2 according to a 2.5G transmission rate.

Optionally, when the number of target control words obtained through the conversion is relatively large, because the super frame has the reserved byte, the redundant target control word may be stored in the reserved byte.

It should be noted that, when the RE1 sends each target basic frame to the RE2 according to the 2.5G transmission rate, each target basic frame is sent by using an M port of the RE1, where the M port is an interface that supports the 2.5G transmission rate.

This embodiment provides a data forwarding method, and according to this embodiment, an RE can complete conversion of each basic frame from a high rate to a low rate, so that the RE can forward data according to a rate different from a rate at which the data is received.

Embodiment 3

A schematic diagram of a base station shown in FIG. 3 is also applicable to this embodiment. The base station includes an REC and REs whose transmission rates are 5G, 2.5G, and 1.25G separately.

Figure 5:
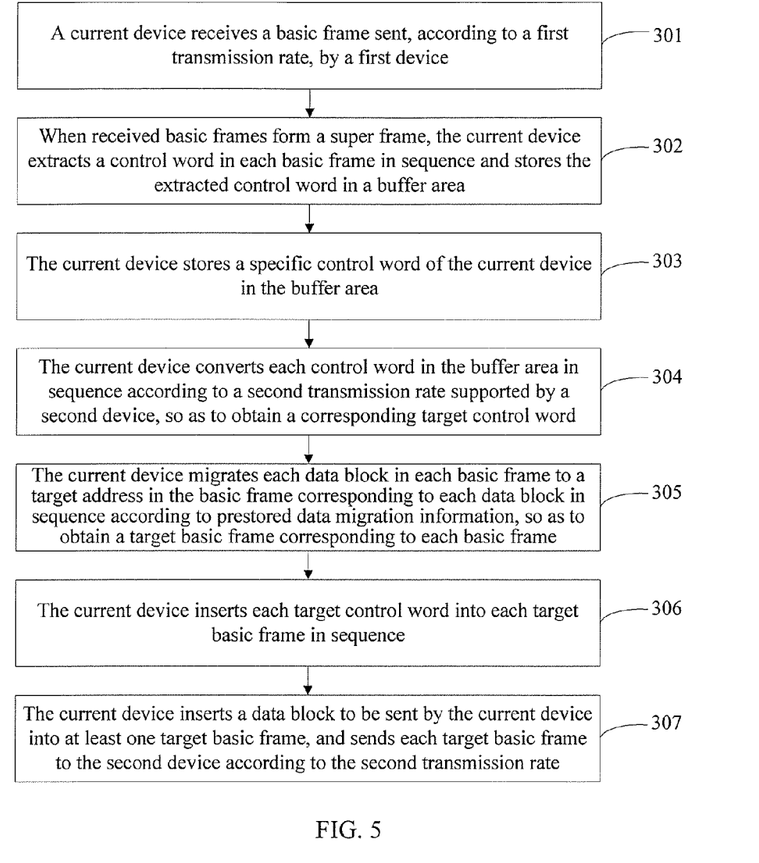
FIG. 5 is a flowchart of a data forwarding method according to Embodiment 3.

As shown in FIG. 5, in an implementation manner of the embodiment of the present invention, a forwarding process of uplink CPRI data is used as an example to introduce a data forwarding method. In the implementation manner, a first transmission rate is less than a second transmission rate, a current device is an RE, a first device is an RE, and a second device is an RE or the REC.

As shown in FIG. 3, that the current device is an RE1, the first device is an RE2, and the second device is the REC is used as an example to specifically describe this embodiment.

301: The current device receives a basic frame that is sent by the first device according to the first transmission rate.

As shown in FIG. 1, each basic frame includes a control word area and IQ data areas, where the control word area is used to carry a control word and corresponds to an area indicated by Word 0 in FIG. 1; and the IQ data areas are used to carry IQ data and correspond to areas indicated by Words 1-15 in FIG. 1.

When a basic frame is transmitted according to a different transmission rate, the number of data bits that can be stored in each field area (that is, a storage area represented by each Word within Word 0-Word 15 in FIG. 1) in the basic frame is also different.

For example, under a 2.5G transmission rate, data that can be stored in each field area in the basic frame is 10 Bytes, where data that can be stored in the field area Word 0 used for carrying a control word is 10 Bytes and total data that can be stored in the field areas Words 1-15 used for carrying IQ data is 10*15=150 Bytes.

For another example, under a 5G transmission rate, data that can be stored in each field area in the basic frame is 20 Bytes, where data that can be stored in the field area Word 0 used for carrying a control word is 20 Bytes and total data that can be stored in the field areas Words 1-15 used for carrying IQ data is 20*15=300 Bytes.

To clearly describe the embodiment of the present invention, the following uses the first transmission rate being 2.5G and the second transmission rate being 5G as an example for description.

For example, this step specifically is: the RE1 receives a basic frame that is sent by the RE2 according to the 2.5G transmission rate.

It should be noted that, when the RE1 receives the basic frame sent by the RE2, the basic frame is received by using an M port of the RE1, where the M port is an interface that supports the 2.5G transmission rate.

302: When received basic frames form a super frame, the current device extracts a control word in each basic frame in sequence and stores the extracted control word in a buffer area.

An RE performs an operation on data by using a super frame as a basic unit. Control words included in a super frame may be classified into two types: One type is valid control words and the other type is invalid control words.

The valid control words include a specific control word and a non-specific control word, where the specific control word is an HDLC control word corresponding to a slow control and maintenance channel and an ETH control word corresponding to a fast control and maintenance channel; and the non-specific control word is a valid control word except for the specific control words. An invalid control word is a reserved byte.

303: The current device stores the specific control word of the current device in the buffer area.

Specifically, the current device stores the HDLC control word corresponding to the slow control and maintenance channel and the ETH control word corresponding to the fast control and maintenance channel in the buffer area.

304: The current device converts each control word in the buffer area in sequence according to a second transmission rate supported by the second device, so as to obtain a corresponding target control word.

For example, the RE1 converts each control word in the buffer area in sequence according to a 5G transmission rate supported by the REC, so as to obtain the corresponding target control word.

In an implementation manner of the embodiment of the present invention, when the control word in the buffer area is a specific control word, the current device converts all bits of the specific control word to target bits corresponding to the second transmission rate supported by the second device, so as to form the target control word.

For example, under the 2.5G transmission rate, each control word may be represented by using 10 Bytes. If the transmission rate supported by the REC is 5G, 20 Bytes of data can be included in each Word in a basic frame of the REC. Therefore, when the control word in the buffer area is a specific control word, the RE1 needs to convert every two control words with 10 Bytes to a control word with 20 Bytes.

In an implementation manner of the embodiment of the present invention, when the control word in the buffer area is a non-specific control word, the current device supplements zeros in corresponding places after the non-specific control word according to the second transmission rate supported by the second device, so as to form the target control word.

For example, under the 2.5G transmission rate, each control word may be represented by using 10 Bytes. If the transmission rate supported by the REC is 5G, 20 Bytes of data can be included in each Word in a basic frame of the REC. Therefore, when the control word in the buffer area is a non-specific control word, the RE1 supplements zeros in the last 10 Bytes in each non-specific control word.

305: The current device migrates each data block in each basic frame in sequence according to prestored data migration information, so as to obtain a target basic frame corresponding to each basic frame.

The data migration information includes migration information of each basic frame, and the migration information of each basic frame includes: the number of data blocks, an identifier of each data block, a length of an area on which each data block resides, a start address of each data block before the migrating, and a start address of each data block after the migrating, which are included in the basic frame.

The data migration information may be obtained by the REC by performing pre-calculation according to different transmission rates respectively supported by the first device, the second device, and the current device, and is respectively saved in the first device, the second device, and the current device before CPRI link data forwarding is performed. In the data migration information, how to migrate the data blocks in the basic frame according to a different transmission rate is specified.

Specifically, the data migration information includes the migration information of each basic frame, and the migration information of each basic frame may be stored in the following form in the current device, as shown in Table 3.

TABLE 3

| FIELD | Length (Byte) |
|---|---|
| Downlink original data block: | |
| Number of Shifting-field | 2 |
| >Field ID | 2 |
| >Start Bit | 2 |
| >Bit Length | 2 |
| Downlink destination data block: | |
| >Start Bit | 2 |

In this embodiment, an uplink original data block refers to a data block that is in a basic frame and sent by the RE2 to the RE1, and an uplink destination data block refers to a data block after the RE1 performs data migration.

Attributes of an uplink original data block are as follows:

Number of Shifting-field: indicating the number of data blocks included in the basic frame;

Field ID: indicating an identifier of each data block;

Start Bit: indicating a start address of each data block before migrating; and

Bit Length: indicating a length of an area on which each data block resides.

Attributes of an uplink destination data block are as follows:

Start Bit: indicating a start address of each data block after migrating.

306: The current device inserts each target control word into each target basic frame in sequence.

It should be noted that, in this embodiment, because the number of specific control words of the current device that are stored in the buffer area is less than or equal to the number of specific control words in the super frame that are received by the current device and also because every two specific control words in the buffer area are combined into one target control word after conversion, the number of target control words obtained after the conversion is less than or equal to the number of control words after the conversion. Therefore, a target frame can have sufficient control word areas to store the target control words.

307: The current device inserts a data block to be sent by the current device into at least one target basic frame, and sends each target basic frame to the second device according to the second transmission rate.

For example, the RE1 inserts a data block to be sent by the RE1 into at least one target basic frame, and sends each target basic frame to the REC according to the 5G transmission rate.

It should be noted that, when the RE1 sends each target basic frame to the REC according to the 5G transmission rate, each target basic frame is sent by using an S port of the RE1, where the S port is an interface that supports the 5G transmission rate.

It should be noted that the foregoing embodiment provided in the present invention is also applicable to a multi-mode base station and a forwarding method is the same, which is not repeatedly described herein.

This embodiment provides a data forwarding method, and according to this embodiment, an RE can complete conversion of each basic frame from a low rate to a high rate, so that the RE can forward data according to a rate different from a rate at which the data is received.

Embodiment 4

Figure 6:
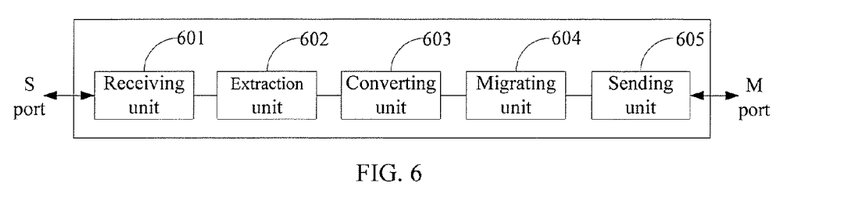
FIG. 6 is a structural diagram of a data forwarding device according to Embodiment 4.

Refer to FIG. 6, which is a structural diagram of a data forwarding device according to this embodiment specifically includes:

a receiving unit 601, configured to receive a basic frame that is sent by a first device according to a first transmission rate, where the basic frame includes a control word and at least one data block;

an extraction unit 602, configured to: when received basic frames form a super frame, extract a control word in each basic frame in sequence and store the extracted control word in a buffer area;

a converting unit 603, configured to convert each control word in the buffer area in sequence according to a second transmission rate supported by a second device, so as to obtain a corresponding target control word;

a migrating unit 604, configured to migrate each data block in each basic frame in sequence according to prestored data migration information, so as to obtain a target basic frame corresponding to each basic frame, where the data migration information includes migration information of each basic frame, and the migration information of each basic frame includes: the number of data blocks, an identifier of each data block, a length of an area on which each data block resides, a start address of each data block before the migrating, and a start address of each data block after the migrating, which are included in the basic frame; and a sending unit 605, configured to insert each target control word into each target basic frame in sequence, and send each target basic frame to the second device according to the second transmission rate.

Further, when the first transmission rate is greater than the second transmission rate, the converting unit 603 is specifically configured to: when the control word in the buffer area is a specific control word, convert all bits of the specific control word to target bits corresponding to the second transmission rate supported by the second device, so as to form the target control word; and when the control word in the buffer area is a non-specific control word, retain a part of bits, corresponding to the second transmission rate supported by the second device, in the non-specific control word, and delete other bits, so as to form the target control word.

Further, the extraction unit 602 is further configured to extract a data block that is in the basic frame and belongs to the current device.

Further, when the first transmission rate is less than the second transmission rate, the converting unit 603 is specifically configured to: when the control word in the buffer area is a specific control word, convert all bits of the specific control word to target bits corresponding to the second transmission rate supported by the second device, so as to form the target control word; and when the control word in the buffer area is a non-specific control word, supplement zeros in corresponding places after the non-specific control word according to the second transmission rate supported by the second device, so as to form the target control word.

Figure 7:
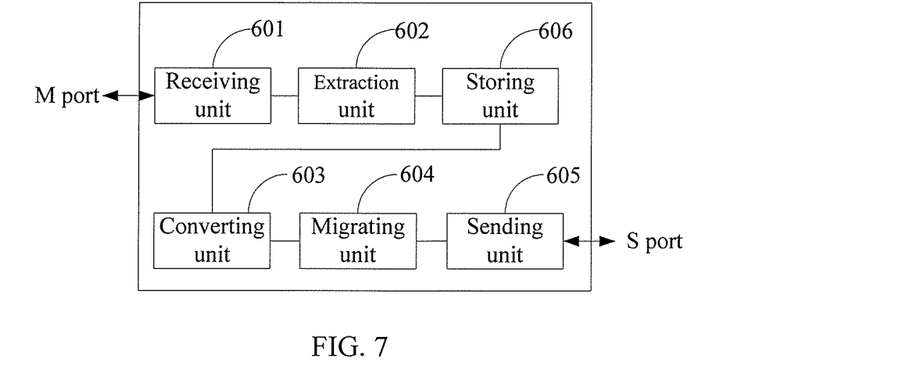
FIG. 7 is a structural diagram of a second data forwarding device according to Embodiment 4.

Further, referring to FIG. 7, the data forwarding device further includes:

a storing unit 606, configured to store the specific control word of the current device in the buffer area.

Figure 8:
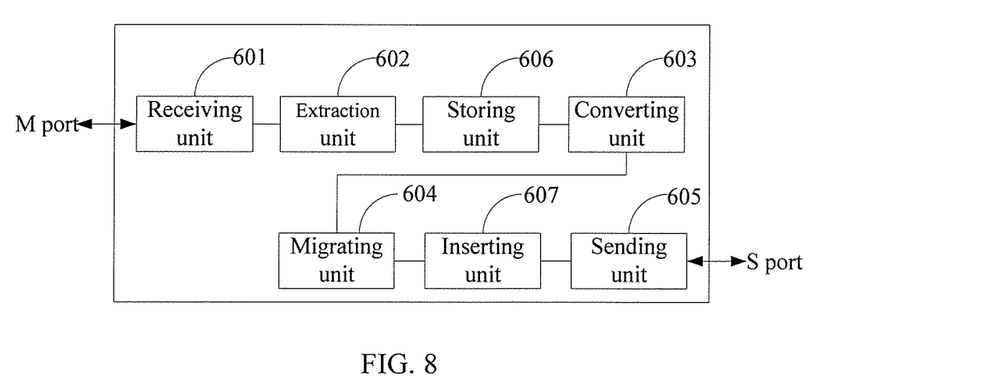
FIG. 8 is a structural diagram of a third data forwarding device according to Embodiment 4.

Further, referring to FIG. 8, the data forwarding device further includes:

an inserting unit 607, configured to insert a data block to be sent by the current device, into at least one target basic frame.

Further, the specific control word is an HDLC control word corresponding to a slow control and maintenance channel and an ETH control word corresponding to a fast control and maintenance channel.

Further, the data forwarding device is an RE.

This embodiment further provides a base station, which includes the first device, the second device, and the data forwarding device.

When the first transmission rate is greater than the second transmission rate, the first device is an REC or an RE and the second device is an RE.

When the first transmission rate is less than the second transmission rate, the first device is an RE and the second device is an REC or an RE.

The embodiment of the present invention provides a data forwarding device and a base station, and according to this embodiment, an RE can complete conversion of each basic frame from a first transmission rate to a second transmission rate, so that the RE can forward data according to a rate different from a rate at which the data is received.

Based on the foregoing descriptions of the implementation manners, a person skilled in the art may clearly understand that the present invention may be implemented by software in addition to a necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, a network device, or the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data forwarding method, comprising:
    receiving, by a current device, a basic frame sent by a first device according to a first transmission rate, wherein the basic frame comprises a control word and at least one data block;
    when received basic frames form a super frame, extracting, by the current device, a control word in each basic frame in sequence, and storing in a buffer area;
    converting, by the current device, each control word in the buffer area in sequence according to a second transmission rate supported by a second device, so as to obtain a corresponding target control word;
    migrating, by the current device, each data block in each basic frame in sequence according to prestored data migration information, so as to obtain a target basic frame corresponding to each basic frame, wherein the data migration information comprises migration information of each basic frame, and the migration information of each basic frame comprises: the number of data blocks, an identifier of each data block, a length of an area on which each data block resides, a start address of each data block before the migrating, and a start address of each data block after the migrating, which are comprised in the basic frame; and inserting, by the current device, each target control word into each target basic frame in sequence, and sending each target basic frame to the second device according to the second transmission rate.

2. The method according to claim 1, wherein when the first transmission rate is greater than the second transmission rate, converting, by the current device, each control word in the buffer area in sequence according to a second transmission rate supported by a second device, so as to obtain a corresponding target control word comprises:

when the control word in the buffer area is a specific control word, converting, by the current device, all bits of the specific control word to target bits corresponding to the second transmission rate supported by the second device, so as to form the target control word; and when the control word in the buffer area is a non-specific control word, retaining, by the current device, a part of bits, corresponding to the second transmission rate supported by the second device, in the non-specific control word, and deleting other bits, so as to form the target control word.

3. The method according to claim 2, wherein before converting, by the current device, each control word in the buffer area in sequence according to a second transmission rate supported by a second device, so as to obtain a corresponding target control word, the method further comprises:

extracting, by the current device, a data block that is in the basic frame and belongs to the current device.

4. The method according to claim 2, wherein the specific control word is an HDLC control word corresponding to a slow control and maintenance channel, and an ETH control word corresponding to a fast control and maintenance channel.

5. The method according to claim 1, wherein when the first transmission rate is less than the second transmission rate, converting, by the current device, each control word in the buffer area in sequence according to a second transmission rate supported by a second device, so as to obtain a corresponding target control word comprises:

when the control word in the buffer area is a specific control word, converting, by the current device, all bits of the specific control word to target bits corresponding to the second transmission rate supported by the second device, so as to form the target control word; and when the control word in the buffer area is a non-specific control word, supplementing, by the current device, zeros in corresponding places after the non-specific control word according to the second transmission rate supported by the second device, so as to form the target control word.

6. The method according to claim 5, wherein before converting, by the current device, each control word in the buffer area in sequence according to a second transmission rate supported by a second device, so as to obtain a corresponding target control word, the method further comprises:

storing, by the current device, the specific control word of the current device in the buffer area.

7. The method according to claim 6, wherein before sending each target basic frame to the second device according to the second transmission rate, the method further comprises:

inserting, by the current device, a data block to be sent by the current device, into at least one target basic frame.

8. A data forwarding device, comprising:

a communication interface, configured to receive a basic frame sent by a first device according to a first transmission rate, wherein the basic frame comprises a control word and at least one data block;

at least one processor, configured to: when received basic frames form a super frame, extract a control word in each basic frame in sequence and store the extracted control word in a buffer area;

the at least one processor, configured to convert each control word in the buffer area in sequence according to a second transmission rate supported by a second device, so as to obtain a corresponding target control word;

the at least one processor, configured to migrate each data block in each basic frame in sequence according to prestored data migration information, so as to obtain a target basic frame corresponding to each basic frame, wherein the data migration information comprises migration information of each basic frame, and the migration information of each basic frame comprises: the number of data blocks, an identifier of each data block, a length of an area on which each data block resides, a start address of each data block before the migrating, and a start address of each data block after the migrating, which are comprised in the basic frame; and the communication interface, configured to insert each target control word into each target basic frame in sequence, and send each target basic frame to the second device according to the second transmission rate.

9. The device according to claim 8, wherein when the first transmission rate is greater than the second transmission rate, the at least one processor is configured to:

when the control word in the buffer area is a specific control word, convert all bits of the specific control word to target bits corresponding to the second transmission rate supported by the second device, so as to form the target control word; and when the control word in the buffer area is a non-specific control word, retain a part of bits, corresponding to the second transmission rate supported by the second device, in the non-specific control word, and delete other bits, so as to form the target control word.

10. The device according to claim 9, wherein the at least one processor is further configured to extract a data block that is in the basic frame and belongs to the current device.

11. The device according to claim 9, wherein the specific control word is an HDLC control word corresponding to a slow control and maintenance channel, and an ETH control word corresponding to a fast control and maintenance channel.

12. The device according to claim 8, wherein when the first transmission rate is less than the second transmission rate, the at least one processor is configured to:

when the control word in the buffer area is a specific control word, convert all bits of the specific control word to target bits corresponding to the second transmission rate supported by the second device, so as to form the target control word; and when the control word in the buffer area is a non-specific control word, supplement zeros in corresponding places after the non-specific control word according to the second transmission rate supported by the second device, so as to form the target control word.

13. The device according to claim 12, further comprising:
a storage system, configured to store the specific control word of the current device in the buffer area.

14. The device according to claim 13, wherein the at least one processor is configured to insert a data block to be sent by the current device, into at least one target basic frame.

15. The device according to claim 12, wherein the specific control word is an HDLC control word corresponding to a slow control and maintenance channel, and an ETH control word corresponding to a fast control and maintenance channel.

16. The device according to claim 8, wherein the data forwarding device is radio equipment.

\* \* \* \* \*